Patented Oct. 27, 1942

2,299,801

UNITED STATES PATENT OFFICE 2,299,801

MOTOR FUEL

Paul L. Cramer, Highland Park, Mich., assignor to General Motors Corporation, Detroit, Mich., a corporation of Delaware No Drawing. Application July 22, 1938, Serial No. 220,794

1 Claim. (Cl. 260—682)

The invention relates to hydrocarbon motor fuels having novel properties and to a method of preparing and using such fuels. The product is of especial utility as a fuel for internal combustion engines operating with high compression or under conditions likely to induce detonation or "knocking" when ordinary gasolines are used.

It is known that some hydrocarbons have very much less tendency to detonate or "knock" under high compressions in an internal combustion engine than others. "Iso-octane" (2,2,4-trimethyl pentane), for example, possesses very high anti-detonating properties, so high that it is now established as a standard for rating the anti-knock value or "octane number" of commercial gasolines. It is also employed as a commercial fuel, especially for aviation engines, generally blended with other fuels of lower anti-knock value. By blending with other fuels of naturally high octane number, especially with the addition of anti-knock agents such as tetraethyl lead, fuels of high anti-knock value are obtained even up to "100 octane," i. e., substantially the equivalent of iso-octane itself.

I have found that certain of the decanes have anti-knock value equal to or superior to that of iso-octane with other properties rendering them useful for fuels for high-compression engines. The decanes possessing the higher anti-knock properties are those in which the molecular structure is the more highly centralized, i. e., those in which there is a high degree of branching of the carbon chain. Two isomers having such molecular structure are the tetramethyl hexanes, (2,2,3,4- and 2,3,4,4-tetramethyl hexane.) My investigations indicate that one or both of these isomers constitute much the greater portion of the product of the present invention. At any rate, these are the decanes which should theoretically result from the process employed. Relatively small amounts of 3,5,5-trimethyl heptane may also be present.

This process comprises broadly two steps, first, the synthesis of certain diamylenes and, second, the hydrogenation of the diamylenes to yield the decanes desired. The diamylenes desired, viz., those in which the branching of the carbon chain is most highly developed, may be obtained as the principal dimers resulting from the polymerization of either trimethyl ethylene or unsymmethyl ethyl ethylene with sulphuric acid, the first mentioned giving much the better yield. The second mentioned yields some of the same dimers but also probably forms with sulphuric acid a relatively stable ester of sec-butyl carbinol which reduces the yield. The principal desirable intermediate or starting substance, therefore, is the trimethyl ethylene.

The conversion of either of the amylenes mentioned to the dimer may be accomplished, for example, by treatment with sulphuric acid of approximately 75% concentration. The following may be given as a specific example suitable for the purpose of illustration. 531 grams of trimethyl ethylene was dissolved in 1 liter of 75% (by weight) sulphuric acid with agitation and cooling to keep the temperature below about 50° C. The reaction was then completed by heating for one hour at 50° C. The product was separated and purified by washing with water and drying by usual methods. A yield of dimers boiling at 151–158° C. was obtained, amounting to 85% of theoretical yield.

The amylenes mentioned, especially trimethyl ethylene, may therefore be used directly as a starting material for the preparation of the diamylenes. They are found associated with other olefins in the products obtained in oil "cracking" operations and may be obtained in a reasonable degree of purity by fractionation. They may be produced, however, by the dehydration of certain of the alcohols which source seems preferable, at least at present, from the standpoint of commercial availability. The dimers may also be synthesized directly from the alcohols.

I have found two of the amyl alcohols to be possible sources for direct production of the desired diamylenes, namely, methyl isopropyl carbinol and dimethyl ethyl carbinol. The first of these gives a good yield of dimer with the formation of a small amount of higher polymers when treated with 75% sulphuric acid. With concentrations of acid below 75% the reaction is very slow and incomplete. Dimethyl ethyl carbinol, however, reacts readily with sulphuric acid in concentrations from 60 to 75% yielding only traces of higher polymers. The following may be given as typical procedure:

269 grams of dimethyl ethyl carbinol was dissolved in 430 grams of 70% (by weight) sulphuric acid with efficient cooling. The reaction was slow at room temperature but was completed in one hour when heated to 50° C. The hydrocarbon was separated from the clear acid layer, washed with water, dried and distilled twice. The yield of product boiling between 152 and 158° C. was 90% of theoretical.

In general, therefore, the diamylenes desired may be prepared from the amylenes mentioned, preferably trimethyl ethylene, or the two amyl alcohols mentioned, preferably dimethyl ethyl carbinol, by treatment with sulphuric acid and suitable control of the temperature. The temperature should be between the approximate limits of 50–80° C., preferably nearer the lower figure. At lower temperatures the reactions are unnecessarily slow and at temperatures above 80°, particularly with higher concentrations of acid, considerable oxidation occurs. The approximate limits of sulphuric acid concentration for most satisfactory results are 60–75%. Concentrations above 81% are likely to cause oxidation.

I have also found that with suitably controlled conditions the action of sulphuric acid on both the amylenes and the amyl alcohols is highly selective, and mixtures of amylenes or of alcohols may therefore be used as starting materials. The primary amyl alcohols do not form polymers with sulphuric acid up to 81% concentration. Of the other amyl alcohols only the methyl isopropyl carbinol and the dimethyl ethyl carbinol react to any material extent with sulphuric acid up to 75% concentration and, as mentioned above, the first of these reacts only very slowly and incompletely with acid concentrations below 75%. I have therefore found it desirable to utilize technical or commercial grades of alcohols, preferably dimethyl ethyl carbinol, as a starting material from which to prepare my new fuel.

In order to restrict the product as nearly as possible to the highly branched carbon chain isomers, I prefer, when starting with technical grades of carbinol, to separate the dehydration step from the polymerization step, thus being enabled to select most suitable conditions for each step. Using a practical commercial grade of dimethyl ethyl carbinol, for example, I dissolve the carbinol in dilute sulphuric acid, approximately 48% acid by weight or 1 to 2 by volume. This may be carried out at room temperature as the heat of solution is not excessive. The dehydration may then be completed at 80–100° C. The lower temperature occasions slightly less loss due to polymerization. A yield of amylenes of 85% of the theoretical amount has been obtained consisting of a mixture of trimethyl ethylene (90%) and unsym-methyl ethyl ethylene.

The amylenes obtained by the foregoing procedure are polymerized by treatment with sulphuric acid as described above with reference to trimethyl ethylene, the acid concentration being 60–75%. An 80% yield of diamylenes, principally tetramethyl hexene, boiling at 149–157° C. has been obtained. Hydrogenation may then be carried out by usual methods.

The decane fraction boiling between 152 and 158° C. has a density of .754 or substantially the same as that of the decanes obtained starting with pure trimethyl ethylene. The critical compression pressure when used as a fuel in internal combustion engines is very high. Tests by the "research method" indicated critical compression pressures of 11:1 or higher for the product obtained as above from commercial dimethyl ethyl carbinol, this being also approximately the same critical compression pressure as that of the decanes obtained from pure trimethyl ethylene. These tests would indicate that the decanes thus obtained are superior to iso-octane as an anti-knock fuel. Other methods of test (for example the A. S. T. M. method) rate the synthetic decane fuel as substantially equal to iso-octane.

The blending value of the synthetic fuel, i. e., the anti-knock effect when blended with other hydrocarbons, is higher than that of like proportions is iso-octane according to tests thus far made. The anti-knock effect of additions of tetraethyl lead is also equally high in blends of the decane fuel. This fuel is therefore suitable for making blended fuels of extremely high anti-knock effect or "octane number" by mixing the decane fuel with other hydrocarbons of lesser anti-knock value but of lower boiling range, thereby increasing the volatility above that of the decane alone, and adding tetraethyl lead. The decane fuel, in order to materially affect the anti-knock value, should be present in amounts of 25% or more.

The decane fuel or blends thereof may be used in the same manner as usual hydrocarbon fuels, viz., by introducing into the engine a mixture of the fuel and a supporter of combustion, as air or oxygen, and igniting the mixture while under compression. The compression ratio, however, may be much higher than with usual fuels thereby materially increasing the power output from an engine of given displacement.

I claim:

A process for producing a mixture of highly branched chain amylenes consisting of substantially pure trimethyl ethylene and substantially pure unsym-methyl ethyl ethylene which includes, treating a mixture of amyl alcohols containing dimethyl ethyl carbinol and undesired amyl alcohols with dilute sulphuric acid of about 48% acid by weight to selectively dehydrate only the dimethyl ethyl carbinol of the mixture of amyl alcohols to obtain a mixture of amylenes consisting of substantially pure trimethyl ethylene and substantially pure unsym-methyl ethyl ethylene.

PAUL L. CRAMER.